July 29, 1947.  S. SIMON ET AL  2,424,585
TELECOMMUNICATION SYSTEM
Filed Jan. 16, 1943  5 Sheets-Sheet 1
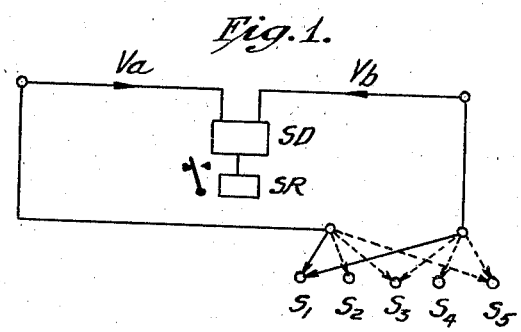
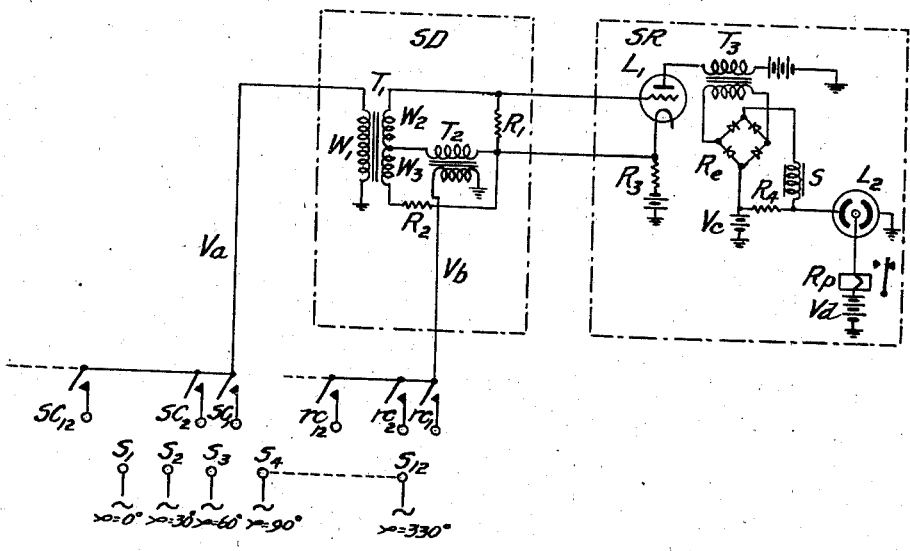
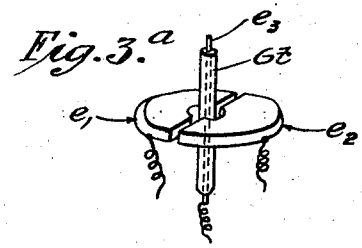
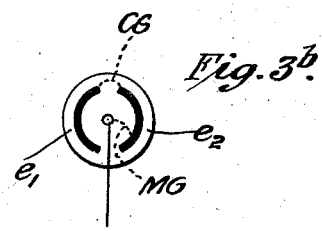
INVENTORS
STEPHANE SIMON
JACOB KRUITHOF
MARTINUS DEN HERTOG
ATTORNEY July 29, 1947.  S. SIMON ET AL  2,424,585
TELECOMMUNICATION SYSTEM
Filed Jan. 16, 1943  5 Sheets-Sheet 2
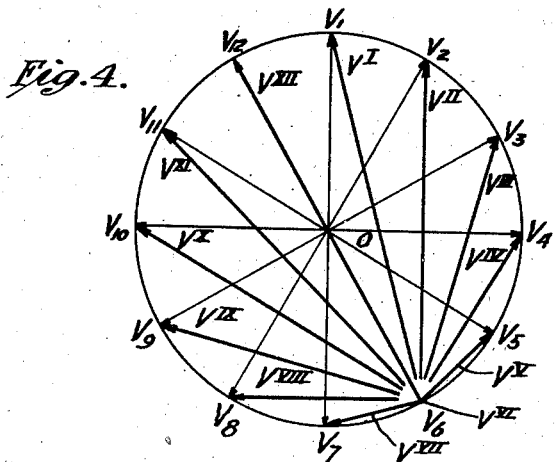
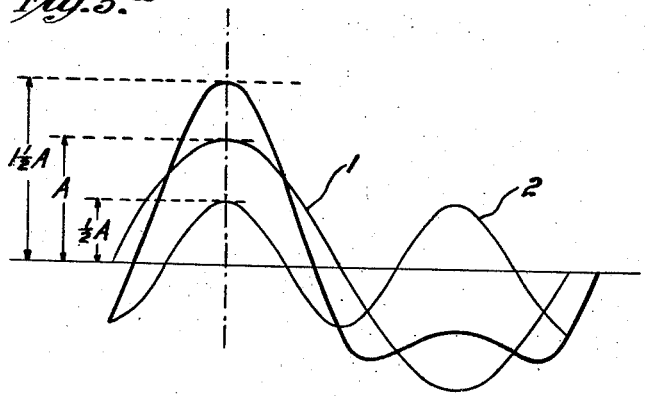
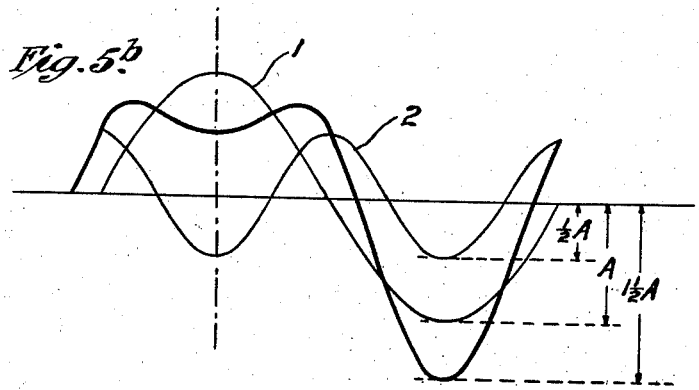
INVENTORS
STEPHANE SIMON
JACOB KRUITHOF
MARTINUS DEN HERTOG
ATTORNEY

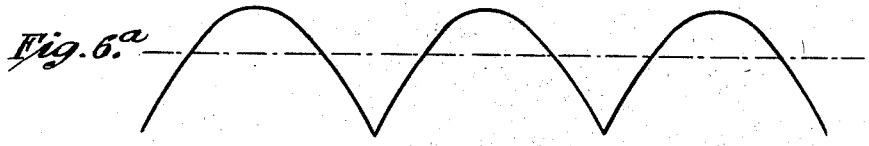
Fig. 6.ª
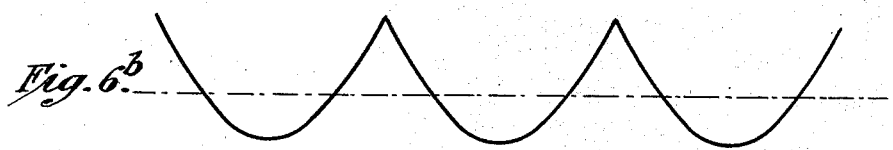
Fig. 6.ᵇ
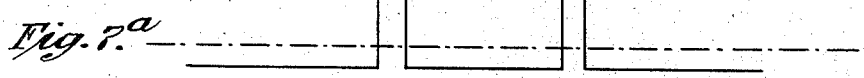
Fig. 7.ª
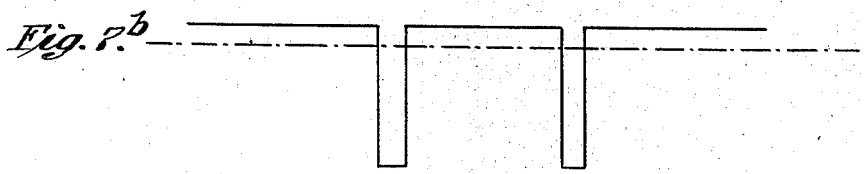
Fig. 7.ᵇ
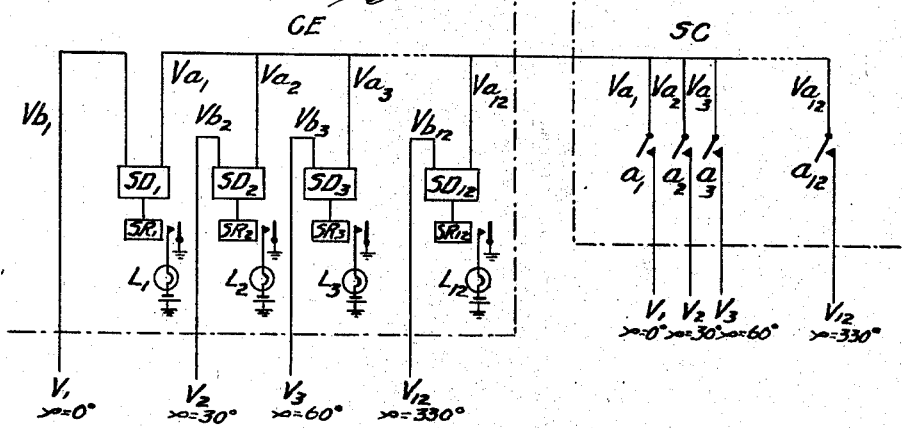
Fig. 10.

INVENTORS
STEPHANE SIMON
JACOB KRUITHOF
MARTINUS DEN HERTOG
BY
ATTORNEY

Patented July 29, 1947

2,424,585

UNITED STATES PATENT OFFICE 2,424,585

TELECOMMUNICATION SYSTEM

Stephane Simon, Jacob Kruithof, and Martinus den Hertog, Antwerp, Belgium, assignors to International Standard Electric Corporation, New York, N. Y., a corporation of Delaware Application January 16, 1943, Serial No. 472,623
In the Netherlands March 7, 1941

22 Claims. (Cl. 179—27)

This invention relates to new and useful improvements in electrical signaling systems over wires such as are used in telephone, telegraph, teleprinter systems and the like.

In such systems signal sending equipment selectively operates signal discriminating devices and associated signal responding devices at a signal receiving point.

The object of the present invention is to permit the sending of and the discrimination between signals transmitted over a limited number of signaling wires.

According to the present invention, one or more signal discriminating devices and their associated signal responding devices are connected with the signal sending equipment, either simultaneously or one after the other. A signaling current potentials and a reference current potentials are simultaneously applied to the discriminating devices and a signal responding device will be permitted to operate only when the two current potentials have predetermined electrical characteristics.

Figure 8:
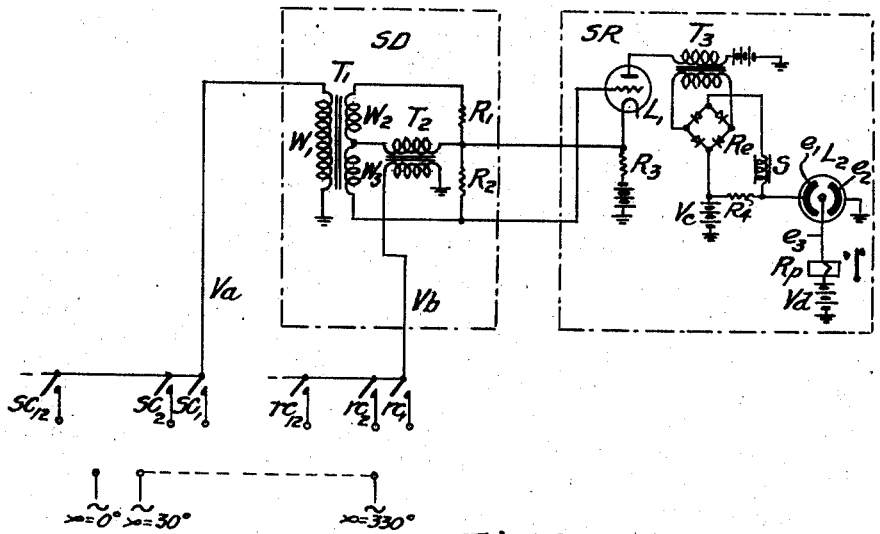
Figure 9:
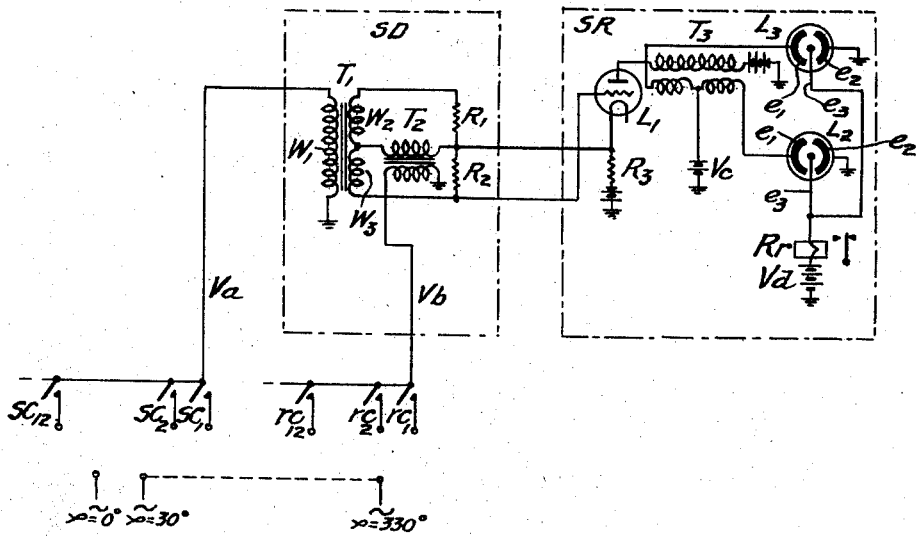
Figure 11:
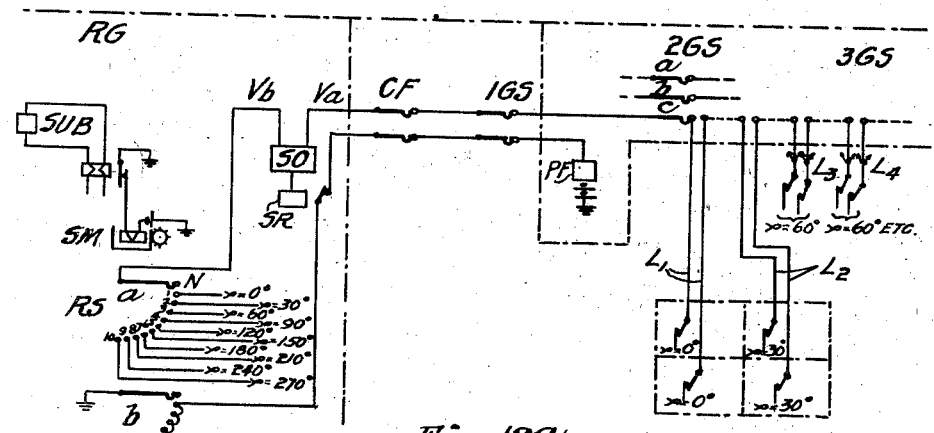

The invention will now be explained in connection with the drawings in which Fig. 1 illustrates the theory of operation; Fig. 2 is a circuit diagram of an embodiment of the invention in a signal discriminating and signal receiving device; Figs. 3 and 3b are, respectively, a perspective and a diagrammatic view of a gaseous discharge tube used in the signal receiving device shown in Fig. 2; Fig. 4 is a vector diagram of the signaling and reference current potentials; Figs. 5a and 5b illustrate wave forms of alternating signaling current potential; Figs. 6a and 6b illustrate wave forms of rectified alternating signaling current potential; Figs. 7a and 7b show interrupted direct signaling current potential; Fig. 8 is a circuit diagram of an alternative of the arrangement shown in Fig. 2 and one in which signaling current potentials having symmetrical wave forms are used; Fig. 9 is another alternative arrangement in which unsymmetrical signaling wave forms, such as are shown in Figs. 5a, 5b, 6a, 6b, 7a and 7b, are used; Fig. 10 diagrammatically illustrates a circuit arrangement for identification, remote instrument control, etc.; Fig. 11 shows as much of the circuits of an automatic telecommunication system as is necessary for the understanding of the application of the present invention thereto; Fig. 12 is a junction diagram; and Fig. 12b is a circuit diagram of an arrangement for identifying the number of a calling subscriber in automatic switching systems, e. g. automatic telephone exchange systems.

Referring first to Fig. 1, a signaling current potential $V_a$ derived from one of a plurality of common sources $S_{1-5}$ (direct current or alternating current source) is applied to one terminal of a signal discriminating device SD. A reference current potential $V_b$ is applied to the other terminal of this signal discriminating device, the reference current potential being derived from the same source from which the signaling current potential is derived.

One practical way of providing a plurality of current potential sources having different characteristics is to feed an alternating current into a transformer having different taps from which current potentials at different levels of potential can be derived. Although these current potentials have different levels of potential, they are alike in all other respects, i. e. they have the same frequency and the same phase angle. Another method of distinguishing between current potentials would be to vary the phase angle of the current potentials derived from different sources. The currents derived from the different sources may be distinguished also by their frequencies or by the number of frequencies of which each current potential consists. Other variants will readily suggest themselves to those skilled in the art.

The signal discriminating device SD is arranged to compare the two currents produced by the current potential received by it and to transmit the result of this comparison to a signal responding device SR. The arrangement is such that the signal responding device SR will operate only when the electrical characteristics of current potential $V_a$ have a predetermined relationship to those of the reference current potential $V_b$, e. g. when the two current potentials have the same electrical characteristics, or when the phase angles of the two current potentials differ by a predetermined value, or when the difference between the two current potentials is of a predetermined value, etc.

One practical embodiment of the invention is shown in Fig. 2 in which twelve sources $S_1$ to $S_{12}$ are indicated. These are alternating current sources having the same potentials and frequency but differing from one another in phase angle. These sources may be connected at will by means of any suitable switching device with signal sending contacts $sc_1$—$sc_{12}$ and through these contacts with a winding $W_1$ of a transformer $T_1$ applying thereto the signaling current potential $V_a$. The sources may be connected also by means of any suitable switching device with reference current connecting contacts $RC_1$—$RC_{12}$ to apply to the primary winding of a transformer $T_2$, the reference current potential $V_b$. The transformers $T_1$, $T_2$, together with resistances $R_1$ and $R_2$, constitute the signal discriminating device SD of Fig. 1.

The windings of transformer $T_1$ constitute a balanced hybrid coil arrangement and the current induced by the reference current produced by potential $V_a$ in the secondary winding of transformer $T_2$ will divide in opposite directions through the two windings $W_2$ and $W_3$ of transformer $T_1$ and through two resistances $R_1$ and $R_2$ in such a manner that no potential will be induced in winding $W_1$ of the transformer $T_1$.

An alternating current potential is applied to the grid of a three-electrode vacuum tube $L_1$. The output of this amplifying tube is applied to the primary winding of an output transformer $T_3$. The alternating current is rectified by a rectifying bridge $R_e$ connected with the secondary winding of transformer $T_3$. The resulting pulsating direct current is applied to a resistance $R_4$ in the output of bridge $R_e$. A retardation coil S is connected in series with $R_4$ to smooth out the pulsations which are of the opposite polarity to that of the direct current derived from a source $V_c$ also connected with one terminal of the resistance $R_4$. The other terminal of the resistance is connected with electrode $e_1$ of a cold cathode discharge tube $L_2$. The potential applied to this electrode will be less than the potential of source $V_c$. The tube $L_2$ is so adjusted that it will not function under these conditions.

The signaling current flowing through the winding $W_1$ of the transformer will induce certain potentials in windings $W_2$ and $W_3$. These potentials and the winding ratios of the transformer are so chosen that the potentials of the two currents induced $V_a$ and $V_b$ in the windings $W_2$, $W_3$, will be of the same value but of opposite polarity. No current will, therefore, flow through the resistance $R_1$ and no potential will be applied to the grid of valve $L_1$. Consequently, no current will be delivered through the rectifying bridge $R_e$ to the resistance $R_4$ so that the full potential of the source $V_c$ will be applied through the resistance $R_4$ to the electrode $e_1$ of the cold cathode tube $L_2$.

The tube $L_2$ is of the type which requires a certain control gap breakdown potential $V_x$ to ionize the control gap CG between the electrodes $e_1$ and $e_2$ and a substantially higher main gap breakdown potential $V_y$ to ionize the main gap MG between the central electrode or anode $e_3$ and one of the cathodes $e_1$, $e_2$. Once the control gap CG between the electrodes $e_1$, $e_2$ is ionized, a sustaining potential $V_z$ which is much lower than the main gap breakdown potential $V_y$ will be sufficient to establish the flow of current in the main gap MG between electrodes $e_2$ and $e_3$.

The potential of source $V_c$ is slightly higher than potential $V_x$ and the potential of a source $V_d$ is sufficient as a sustaining potential $V_z$ for the tube $L_2$. The potential of $V_c$ when reduced by potential applied across $R_4$ from the rectifying bridge $R_e$, will be lower than potential $V_x$.

It will be clear, therefore, that when no potential is applied to the grid of tube $L_1$ by the discriminating device SD, the potential from source $V_c$ will cause the ionization of the tube $L_2$ and current will flow through the gap MG between cathode $e_2$ and anode $e_3$. This current will cause the energization on the signaling relay of $R_r$.

It will be noted that the discriminating device SD and particularly the hybrid coil arrangement is such that the currents induced by the application of $V_a$ and $V_b$ are subtracted from one another so that when they have the same frequency and produce in resistance $R_1$ a current having the same amplitude, phase and potential, then the resultant alternating current grid potential derived from $R_1$ will be zero. This will cause the operation of relay $R_r$ in the signal responsive device SR.

The advantage of this "zero" arrangement is that very small A. C. signaling potentials can be used.

If N sources of alternating current having N different phases are employed, then the signal receiving equipment will function when the combined potential resulting from the application of the signaling and the reference current potentials $V_a$ and $V_b$ is zero volts and will not function when this voltage amounts to $$2V \sin \frac{\pi}{N}$$

where V is the amplitude of the A. C. potential across resistance $R_1$ of Fig. 2 at the moment when only the reference current potential $V_b$ is applied.

This is illustrated by the vector diagram of Fig. 4 for a case in which $N=12$.

In theory, in this "zero" arrangement, the potential across resistance $R_1$ may be amplified to any value. However, in practice the amplification will be limited to the degree of accuracy with which the signaling and reference current potentials can be made to agree in phase and amplitude and the degree of accuracy with which the transformers can be wound. These are the factors that determine the maximum number of phases that can be used and the degree of amplification practicable in the system. In a twelve-phase arrangement, such as is represented in Fig. 4, the theoretical amplitude of the minimum potential across resistance $R_1$, which will not cause the operation of the signal receiver SR, amounts to $2V \sin 150 = 0.52V$.

Assuming that the equilibrium between the signaling and reference currents can be realized with an accuracy of $\pm 5\%$, the resulting potential to which the signal receiver will have to respond, will be approximately 0.05V instead of a theoretical value of zero, i. e. approximately one-tenth of the minimum non-operating value of 0.52V.

Obviously, this is not the only way in which a signal discriminator can be made to function. For instance, the currents produced by the application of $V_a$ and $V_b$ may be added and the signal responding device caused to function only when the resultant current potential reaches a maximum value which approaches either $2V_a$ or $2V_b$.

This "maximum" principle can be applied in a variety of ways.

By adding the potentials produced by the application of the signaling and reference current potentials $V_a$ and $V_b$, a resultant potential is obtained which has a value of $2V \cos \varphi\frac{1}{2}$ where $\varphi$ is the phase difference between the two potentials and V the amplitude of the voltage across resistance $R_2$ when only the reference potential $V_b$ is applied.

In this case the signal receiver SR will function only when the combined potentials resulting from the application of $V_a$ and $V_b$ equals $$2V(\varphi=0)$$

and will not function when the signaling current potential $V_a$ has a phase angle different from but nearest to that of the reference current potential $V_b$.

If N phases are employed, then the amplitude of the maximum voltage on which the signal receiver should not function is $$2V \cos \frac{\pi}{N}$$

Maximum operating limits are obtained if the ratio $$2V \cos \frac{\pi}{N} : 2V$$

is small as compared with 1.

Taking again the 12-phase arrangement as an example, this ratio amounts to $\cos 15° = 0.965$, from which it will be evident that the "maximum potential" scheme in this form does not offer sufficient operating limits with 12 phases.

These operating limits can be considerably improved by using a non-symmetrical wave form, for example by superimposing the second harmonic with the correct phase difference.

When using a fundamental wave having an amplitude A and its second harmonic having an amplitude ½A, wave forms are obtained as indicated in Figs. 5a and 5b. With a signaling system requiring 10 different signals, five of the potentials may have the following form:

$$A\left[\cos\left(wt + K\frac{2\pi}{5}\right) + \frac{1}{2}\cos 2\left(wt + K\frac{2\pi}{5}\right)\right]$$

where K represents the numbers 1 to 5, and the five other potentials may have the form:

$$A\left[\cos\left(wt + K\frac{2\pi}{5}\right) - \frac{1}{2}\cos 2\left(wt + K\frac{2\pi}{5}\right)\right]$$

The above-mentioned ratio is now reduced to approximately 0.64, which would be practical.

Another possible scheme is to use wave forms shown in Figs. 6a and 6b, which are obtained by rectification of alternating potentials.

In this case the ratio for 10 different signals will amount to approximately 0.5.

Alternatively or in combination with Fig. 6a, the wave form of Fig. 6b may be used.

Still another possibility is to use direct current potentials which are interrupted at the same rate, but in which the moments of impulsing are chosen differently for each signal to be transmitted. This is shown in Figs. 7a and 7b.

Two ways in which the addition of the currents resulting from the application of the signaling and reference current potentials may be realised and used to cause the functioning of the discharge tube are shown by Figs. 8 and 9.

Fig. 8 differs from Fig. 2 only in that the grid of valve $L_1$ is connected to resistance $R_2$ instead of $R_1$, and further in that the connections of the rectifying bridge $R_e$ are reversed. Maximum potential is applied to the grid of $L_1$ and, consequently, maximum current to resistance $R_4$ when the signaling current has the same frequency and phase as the reference current. Furthermore, the potential across the terminals of resistance $R_4$ is now in the same direction as that from source $V_c$.

The potential of source $V_c$ is now below the control gap breakdown potential $V_x$ of discharge tube $L_2$. When this potential is added to the maximum potential across resistance $R_4$ resulting from a signaling current having the same frequency and phase as the reference current and also a predetermined potential, then the combined potential will be more than $V_x$. Tube $L_2$ will become ionized.

The arrangement of Fig. 8 is used only when the number of signals is so small as to permit the use of a symmetrical wave form.

The circuit arrangement of Fig. 9 is used with signaling currents having unsymmetrical wave forms, as illustrated in Figures 5a, b, 6a, b or 7a, b. This circuit differs from Fig. 8 in that the alternating currents from the output transformer $T_3$ are not rectified. Two separate secondary windings of $T_3$ are connected directly in series with source of potential $V_c$ to the control anodes of two cold cathode discharge tubes $L_2$ and $L_3$. The potential of $V_c$ is insufficient to ionize $L_2$ and $L_3$, but when the correct signaling current is received, the potential received from $T_2$ is maximum, and when added to $V_c$ will cause the ionization of either $L_2$ or $L_3$, depending on whether the positive or negative half wave has maximum potential. Tubes $L_2$ and $L_3$ may act on a common signaling relay $R_r$.

Fig. 10 shows a circuit arrangement which may be used for identification, remote instrument reading, etc.

A number of signaling contacts $a_1$ to $a_{12}$ are provided for the purpose of communicating speech or other signals to a control equipment and each of which, when closed, will cause the display of a signal, such as the lamps $L_1$ to $L_{12}$, at the control equipment. A single wire serves to transmit all signals between the signaling contacts SC and the control equipment CE.

Each signaling contact is connected to a different source of alternating current $V_1$–$V_{12}$, having different electrical characteristics. In the present case the twelve sources have the same potential and frequency but their phase angles are shifted by multiples of 30°.

The control equipment CE comprises twelve signal discriminators $SD_{1-12}$ and associated responding devices $SR_{1-12}$, each of which controls one of the lamps $L_{1-12}$.

One of the twelve sources of signaling current supplies reference current potential to each of the discriminators and, each of the associated signal responders will function only when a signaling current potential $V_{a1-12}$ is received having the same characteristics as the particular reference current potential $V_{b1-12}$ applied from the common source to the associated signal discriminator.

It will be seen that when, for instance, signaling contact $a_1$ is closed, lamp $L_1$ will burn because the two current potentials $V_{d1}$ and $V_b$ applied to $SD_1$ are equal, so that $SR_1$ responds and $L_1$ is lighted. Similarly, $L_2$ will burn when $a_2$ closes, etc. In other words, the control equipment CE will respond selectively to signals received via a single signaling channel, depending on the agreement between the signaling current potential $V_a$ and reference current potential $V_b$ applied to one of a number of signaling receivers.

Fig. 11 is a simplified diagram of part of an automatic switching equipment, such as is used for establishing connections in telecommunication systems. To the left of the first vertical dotted line, part of a register controller is indicated, in which a step-by-step switch SM having two rotatable contact brushes $a$ and $b$, each wiping over a sector of eleven contacts, represents a digit receiving switch, provided for the purpose of registering the number of impulses sent for one numerical digit by a subscriber's dial. A signal discriminator SD and associated responding device SR at the register controller may be connected via contact brushes of other switches, such as a connection finder CF and a 1st group selector 1GS to a group selector circuit 2GS in the right hand top corner of the figure.

The group selectors are assumed to be of the so-called single-motion type, i. e. they have a number of sets of contacts which may all be wiped over by the contact brushes during one continuous movement of the brush carriage. Such contacts are usually divided into a number of, e. g. ten, groups, the different contacts of each group, or "level" being equivalent and leading each to an equivalent outlet, for example, a further stage of selectors 3GS or one of a group of junctions. The figure shows in a simplified form how four of the contacts are connected to four selectors of further switching stages, viz. the first two to two selectors 3GS corresponding to "level" 2 of the group selector 3GS. In a still more simplified form four more contacts are shown to be used for two further "levels" 3 and 4.

The contacts of each "level" are distinguished from those of other "levels" by the presence on the "c" terminal of an A. C. potential having predetermined characteristics. In the example shown, "level" 1 is characterized by the presence of an A. C. potential with 0° phase shift, level 2 by the presence of an A. C. potential with the same characteristics except for the phase which is shifted 30°, level 3 by a similar A. C. potential of which the phase angle is shifted 60° etc.

The sources of alternating current are connected to the "c" terminals via contacts in the selector circuits connected thereto in such a manner that the connection to the source of A. C. is interrupted when the selector circuit in question is engaged for a connection. It will now be explained how, by this arrangement, the group selector can be made to select a free outlet in a group or "level" corresponding to the digit dialled by the subscriber into the register controller, this selection taking place under direct control of the register controller.

When the subscriber dials a digit into the register controller, for which the corresponding selection has to be made by the group selector 2GS, the register switch SM makes a number of steps corresponding to the numerical digit dialled.

Assuming that the number "2" is dialled, SM will step to position 2 and connect as a reference current potential $V_b$ the source of the A. C. with 30° phase shift to the discriminator SD via brush $a$ of the step-by-step switch. When this switch has made one step, ground is connected via its brush $b$ and a break contact associated with the signal responder SR, brushes of CF and 1GS to power magnet PF of the group selector 2GS which will be set into motion. In wiping over the "c" contact associated with free outlets of "level" 1, the "c" brush of the group selector will first of all connect an A. C. potential with 0° phase shift via brushes of 1GS and CF to the discriminator SD. It should be observed that the different contacts are so spaced in the arc of the group selector that by the time the first contact corresponding to level 1 is reached, the step-by-step switch SM has left positions N or 1, in which the source of A. C. with 0° phase shift is connected as a reference current potential $V_b$ to SD. Consequently, the connection of the A. C. potential with 0° phase shift from the group selector does not cause the signal responder SR to function. When reaching a free outlet of "level" 2, however, an A. C. potential with 30° phase shift is connected via the "c" brush of the group selector and, since in this case the signaling current potential $V_a$ is equal to the reference current potential $V_b$, SR will operate and interrupt the current for the power magnet PF. This stops the brushes of the group selector on the terminals of the free outlet in the second level thus determined.

Assuming that number "3" was sent by the calling subscriber, SM would have made 3 steps. In this case when SM leaves position 2 before the group selector 2GS arrives on the first outlet of "level" 2. Thus, by letting the group selector lag behind the step-by-step switch, stopping of the group selector on the wrong contact will be avoided.

From the above description it will be clear that Fig. 11 shows how the control equipment will respond when the signaling current potential $V_a$ corresponding to a predetermined reference current potential $V_b$ is connected by apparatus which is not associated with the control equipment but functions under the control of the control equipment.

Figure 12A:
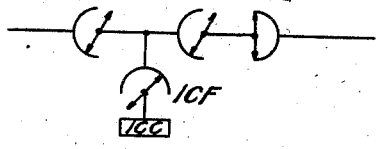
Figure 12B:
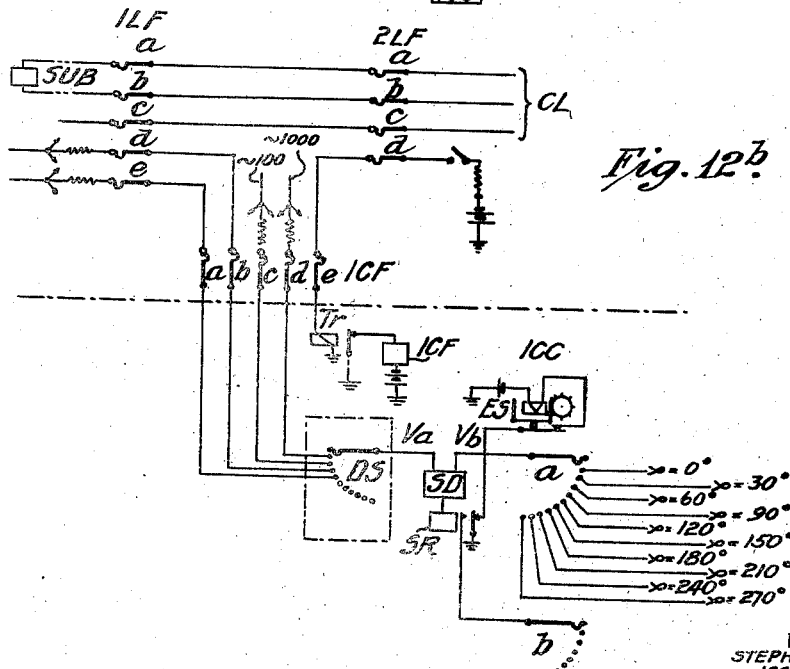

Fig. 12a shows part of a junction diagram and Fig. 12b in a simplified form part of the circuits of an arrangement for identifying the calling party in an automatic switching system for telecommunication purposes.

In both figures, 1LF represents the 1st line finder and 2LF the 2nd line finder, which connect a calling line to a connecting link CL. The line finders shown may be of any well known design, e. g. of the so-called "rotary" type, or of the up-and-around type.

When identification of the calling party's line is wanted, a signal is sent from the connecting link temporarily to connect an identification control circuit ICC to the connection. In the example shown, this control circuit will connect itself by means of the finder ICF to the 1st line finder engaged in the connection. Since one hundred or less consecutively numbered lines are connected in each group of 1st line finders, the identification of the group of line finders handling the call is sufficient to determine, for example, the 100's and the 1000's digits of the calling party's number. The position of the 1st line finder is an indication for the 10's and units digits of the calling line number.

A calling potential for an identification control circuit is connected via brush $d$ of 2LF to those "e" terminals of the link finders ICF which correspond to the 1st LF over which the connection is established. The wipers of the finders ICF are started by a starting circuit (not shown) and one of these finders tests on the 1st line finder in question by operation of the test relay $T_r$ which causes identification to start. Only the principal functions of this identification have been represented, and are as follows:

A digit switch DS is caused to make a step for each of the digits of the calling line number to be identified. Upon making the first step it will connect signaling current potential $V_a$ to SD.

This current is supplied via brush $d$ of finder ICF, to the terminals of which a source of alternating current is connected having predetermined characteristics to denote the 1000's digit of the corresponding line finder group. To identify this digit, the exploring switch ES is rotated, its circuit being under the control of a break contact of SR. The contact brush $a$ of ES will now connect to SD the different sources of A. C. which characterize the different consecutive numbers. This is the reference current. When the reference current potential $V_b$ connected by brush $a$ of ES is in accord with the signaling current potential $V_a$ denoting the 1000's digit, SR functions, and stops ES and connects ground over brush b of ES to register the number thus found. The contacts of the arc b lead to a register mechanism.

Next the digit switch DS is advanced a step, and the same operation recommences to identify the 100's digit by means of the specific alternating current, denoting a particular 100's digit, connected to the "c" arc terminal of ICF, on which brush c is resting.

After this the 10's and units digits are identified consecutively via brushes b and a of ICF, respectively, and brushes d and e of line finder ILF, respectively. For this purpose the "d" arc terminals are connected, in groups of 10, to 10 different sources of A. C. to denote the 10's digit of the corresponding positions, and the "e" arc terminals are so connected that all terminals having equal units digits are strapped and connected to specific alternating current sources.

It should be noted that the same ten sources can be used for all four or more digits to be identified, because the different digits are identified consecutively.

From the above description it will be clear that Figs. 12a and 12b show how the control equipment will respond when the reference current potential $V_b$ has been made to correspond to a predetermined signaling current potential $V_a$ by the action of apparatus associated with the control equipment and functioning under the control of this equipment.

What is claimed is:

1. In an electric switching system, sources of single current potentials of different characteristics, equipment comprising a device responsive to said current potentials, means including a first switch for maintaining in said device a single current potential of a desired one of said characteristics, means including a second switch controlled by said device for applying to the device a series of current potentials of said different characteristics one at a time, and means for operating the device when the characteristics of the current potentials applied by the two switches bear a predetermined relationship to one another.

2. The system according to claim 1, means for operating the second switch for applying to the device one source after the other, and means controlled by the device for stopping the second switch.

3. The system according to claim 1 and a common signaling conductor, means including the first switch for selectively connecting said sources over said conductor to the device, means including the second switch for connecting to the device one source after the other, and means controlled by the device for stopping the second switch when the source connected by it bears a predetermined relationship to the source connected by the first switch.

4. The system according to claim 1 and in which said equipment comprises a plurality of discriminating and responsive devices associated therewith, means for connecting one of said discriminating devices and the associated responding device with one of said sources, and means controlled by the connected discriminating device and associated responding device for controlling the second switch when the sources connected bear a predetermined relationship to one another.

5. The system according to claim 1, characterized in that said device is operated when the amplitude of the current potential determined by the algebraical sum of the instantaneous values of the current potentials applied thereto reaches a value not exceeding a predetermined maximum of approximately zero.

6. The system according to claim 1, characterized in that the device is operated when the current potential determined by the algebraical sum of the current potentials applied thereto has the same electrical characteristics as either of the two current potentials last-mentioned, except for its amplitude, and when this amplitude reaches a value which is at least a predetermined minimum equal approximately to the sum of the amplitudes of the two current potentials applied.

7. The system according to claim 1, comprising a hybrid coil, means including the two switches for applying to the windings of said coil the current potentials over separate paths, said hybrid coil being so arranged that the current potential applied by the second switch will be induced into the path having the current potential applied by the first switch and the latter into the path the current potential applied by the first switch only when the electrical characteristics of the two current potentials have such predetermined relationship that at any moment the potential in at least one of the windings is zero and in at least one other winding has double the value of the potential prevailing when only one of the current potentials is applied, thus indicating that the electrical characteristics of one current potential bear a predetermined relationship to those of the other.

8. The system according to claim 1 comprising a signal discriminating device having a balanced hybrid coil, and a signal responding device connected therewith, a circuit for applying to one winding of said coil one of said current potentials over the first switch, a second circuit for applying over the second switch the other current potential to the electrical midpoint of the other winding of said coil, said windings being so arranged that current potentials can be induced from one circuit into the other only when the connecting point of the signal responding device is at higher than zero potential.

9. A signaling system according to claim 1, comprising a signal discriminating device having a balanced hybrid coil, and a signal responding device connected therewith, a circuit for applying to one winding of said coil one of said current potentials over the first switch, a second circuit for applying the other current potentials over the second switch to the electrical midpoint of the other winding of said coil, said windings being so arranged that current potential can be induced from one circuit into the other only when the connecting point of the signal responding device is at twice the potential prevailing when the one current potential alone is connected only to the balanced hybrid coil.

10. In an electric signaling system, sources of alternating currents of different characteristics, a signal sending equipment adapted selectively to send signaling current potentials of different characteristics, signal receiving equipment comprising a plurality of signal discriminating devices and associated signal responding devices, first switches for connecting a signal discriminating device and the associated responding device with the signal sending equipment, means including second switches for applying a reference current potential from one source after the other to the connected discriminating device, said second switches being controlled by the connected discriminating device, and means for operating the last-mentioned device when the electrical characteristics of the signaling and reference current potentials bear a predetermined relationship to one-another.

11. In an electric signaling system, a signal sending equipment adapted selectively to send alternating signaling currents of different frequencies, signal receiving equipment comprising a plurality of signal discriminating devices and associated signal responding devices, switches for connecting a signal discriminating device with the signal sending equipment, means for simultaneously applying a signaling current of a predetermined frequency and an alternating reference current of a predetermined frequency to the connected discriminating device, and means for operating the last-mentioned device when the frequencies of the signaling and reference currents bear a predetermined relationship to one-another.

12. In an automatic telephone exchange system, a plurality of subscribers' lines, means including automatic selector switches having controlling magnets, wipers and terminals for establishing a connection from a calling to a called line, a central exchange register for variably controlling said selector switches in accordance with the called subscriber's number, a digit switch in the register variably set by the calling subscriber in accordance with a digit of the called number, sources of different potentials connected to and characterizing different terminals of the selector switch and settings of the digit switch, a circuit for each selector magnet, a relay in the register controlling the magnet circuits, a multi-electrode discharge tube in the register having a cathode and a grid electrode in its input and an anode in its output circuit, said relay being responsive to the output circuit, circuits for applying over the digit switch to one of the electrodes in the input circuit the potential characteristic for the setting of the digit switch, and circuits for applying to the other electrode in the input circuit of the tube potentials which the wiper of the selector finds on its terminals, said tube being rendered effective to operate the relay in the output circuit only when the potentials simultaneously applied to the two electrodes in the input circuit bear a predetermined relationship to one another.

13. The telephone system according to claim 12, and in which the relay is controlled by a gas discharge tube in said output circuit.

14. A signaling system according to claim 11, characterized in that the signal responding device comprises an amplifying tube, an output transformer having a primary winding connected with said tube, two interconnected secondary windings for said transformer, two gaseous discharge tubes, each having a control electrode, a source of direct current connected in series with said secondary winding and with said control electrodes, said discharge tubes being adapted effectively to ionize if the sum of the direct current potential and a peak value of a half-wave in the secondary winding considered exceeds a predetermined minimum, parallel connected anodes for the discharge tubes and a relay controlled by said anodes.

15. In an electric signaling system, a signal sending equipment adapted selectively to send alternating signaling currents of different combinations of frequencies, signal receiving equipment comprising a plurality of signal discriminating devices and associated signal responding devices, switches for connecting a signal discriminating device and the associated responding device with the signal sending equipment, means for simultaneously applying a signaling current of a predetermined combination of frequencies and an alternating reference current of a predetermined combination of frequencies to the connected discriminating device, and means for operating the last-mentioned device when the combinations of frequencies of the signaling and reference currents bear a predetermined relationship to one-another.

16. In an electric signaling system, a signal sending equipment adapted selectively to send alternating signaling current potentials of different phase angles, signal receiving equipment comprising a plurality of signal discriminating devices and associated signal responding devices, switches for connecting a signal discriminating device and the associated responding device with the signal sending equipment, means for applying to the connected discriminating device a signaling current potential having a predetermined phase angle, switching means for applying one after the other alternating reference current potentials having different phase angles to the connected discriminating device, means controlled by the device for controlling the last-mentioned switching means, and means for operating the last-mentioned device when the phase angles of the signaling and reference current potentials bear a predetermined relationship to one-another.

17. In an automatic telephone system, a plurality of lines, switches for connecting a calling line with a called line, impulse devices for variably operating the switches in accordance with the wanted number, a discriminating device, means for applying to said discriminating device reference currents of different characteristics depending upon the operation of said impulse device, means controlled by said switches for applying to said discriminating device signaling currents of conjugate different characteristics depending upon the operation of the switch and a circuit for stopping the switch controlled by the discriminating device when the relationship between the signaling and reference currents applied thereto is of a predetermined character.

18. In an automatic telephone system, subscribers' lines, impulse senders at said lines, a register controller variably operable by the calling subscriber in accordance with the wanted number, successive switching stages controlled by said controller, a discriminating device and signal responding device in said register controller, a switch variably operated depending on the operation of the register controller for applying to said discriminating device reference currents of different characteristics, contacts in a switching stage controlled by the register controller for applying signaling currents of conjugate different characteristics depending upon the operation of the switching stage under the control of the register controller, means for operating the discriminating device when the signaling and reference currents bear a predetermined relationship to one-another, a circuit controlled by the discriminating device to operate the associated signal responding device, and a circuit for stopping the operation of the switching stage controlled by the responding device.

19. In a system for identifying calling subscribers, a plurality of numerically designated lines, a first line finder for seizing the calling line, an identification control circuit, a switch for temporarily connecting said line finder with said circuit, a signal discriminating device and associated signal responding device, a digit switch, a magnet for operating said digit switch one step for each of the digits of the calling line's number, a signaling current of special characteristics individual to each digit connected by said digit switch to said discriminating device, a stepping switch controlled by the signal responding device, a circuit controlled by the stepping switch for applying to the discriminating device simultaneously with the connection of the signaling current a reference current of predetermined characteristics and means for registering the number of the calling line of the characteristics of the signaling current and reference current, bear a predetermined relationship.

20. In a selecting system, a switch having a first and a second set of cooperating contacts and a magnet for moving one set with respect to the other, a source of current, a variably operable device, means for applying currents of different characteristics to said device depending on the variations in the operation thereof, a connection between said device and the first set of contacts, means for applying a characteristic current to the second set of contacts, an actuating circuit for said device including both sets of contacts, means for actuating said device when the current applied thereto bears a predetermined relationship to the characteristic current applied to the second set of contacts connected through said actuating circuit to said device, and a circuit for operating said magnet controlled by said device.

21. In a selecting system, a plurality of switches, each having a first and a second set of cooperating contacts and a magnet for moving one set with respect to the other, a source of current, a variably operable device common to said switches, means associated with said device for applying currents of different characteristics to said device depending on the variations in the operation thereof, means for connecting said device with the first set of contacts of one of said switches, means for applying a characteristic current to the second set of contacts of the last-mentioned switch, an actuating circuit for said device including both sets of contacts of the connected switch, means for actuating said device when the current applied thereto bears a predetermined relationship to the characteristic current applied to the second set of contacts connected through said actuating circuit to said device, and a circuit for operating the magnet of the connected switch controlled by said device.

22. In a selecting system, a switch having a first set and a plurality of second sets of cooperating contacts and a magnet for moving the first with respect to the second sets, a source of current, a variably operable device, means for applying currents of different characteristics to said device depending on the variations in the operation thereof, a connection between said device and the first set of contacts, means for applying a characteristic current to a certain one of the second sets of contacts, an actuating circuit for said device including both sets of contacts, means for actuating said device when the current applied thereto bears a predetermined relationship to said characteristic current, and a circuit for operating said magnet controlled by said device.

STEPHANE SIMON.
JACOB KRUITHOF.
MARTINUS DEN HERTOG.

REFERENCES CITED

The following references are of record in the file of this patent:

UNITED STATES PATENTS

| Number | Name | Date |
| --- | --- | --- |
| 2,319,424 | Maloney | May 18, 1943 |
| 2,284,870 | Holden | June 2, 1942 |
| 2,306,729 | Holden | Dec. 29, 1942 |
| 2,252,766 | Holden | Aug. 19, 1941 |
| 2,267,950 | Rhodes | Dec. 30, 1941 |
| 2,270,246 | Bascom | Jan. 20, 1942 |